(12) United States Patent
Sumiya et al.

(10) Patent No.: US 7,533,840 B2
(45) Date of Patent: May 19, 2009

(54) REEL AND RECORDING TAPE CARTRIDGE

(75) Inventors: Yosuke Sumiya, Kanagawa (JP); Teruo Ashikawa, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 83 days.

(21) Appl. No.: 11/790,775

(22) Filed: Apr. 27, 2007

(65) Prior Publication Data

US 2007/0252026 A1    Nov. 1, 2007

(30) Foreign Application Priority Data

Apr. 27, 2006    (JP) .............................. 2006-123918

(51) Int. Cl.
*G11B 15/32*    (2006.01)
(52) U.S. Cl. .................... 242/348; 242/608.8; 242/609; 242/613
(58) Field of Classification Search ................ 242/348, 242/348.2, 609, 609.1, 610, 610.4, 610.5, 242/610.6, 611, 611.1, 613, 613.4, 608, 608.8
See application file for complete search history.

(56) References Cited

U.S. PATENT DOCUMENTS

| | | | | |
|---|---|---|---|---|
| 1,410,014 A | * | 3/1922 | Hurlburt | ...................... 242/609 |
| 3,041,005 A | * | 6/1962 | Wallace | .................... 242/609.1 |
| 3,323,745 A | * | 6/1967 | Landgraf | .................. 242/586.2 |
| 5,564,647 A | * | 10/1996 | Bay et al. | ................. 242/608.8 |
| 6,045,087 A | * | 4/2000 | Vislocky et al. | .......... 242/608.6 |
| 6,257,519 B1 | | 7/2001 | Willems et al. | |
| 7,300,016 B2 | * | 11/2007 | Brown et al. | ............. 242/613.4 |
| 7,347,397 B2 | * | 3/2008 | Ishikawa et al. | ......... 242/613.4 |
| 2003/0226924 A1 | * | 12/2003 | Morita | ........................ 242/348 |
| 2003/0226931 A1 | * | 12/2003 | Morita | .................... 242/610.4 |

FOREIGN PATENT DOCUMENTS

JP    2001-118358 A    4/2001

* cited by examiner

*Primary Examiner*—William A Rivera
(74) *Attorney, Agent, or Firm*—Sughrue Mion, PLLC

(57) ABSTRACT

A reel that includes: an upper flange and a lower flange that retain width direction edge portions of a recording tape; a lower circular cylinder portion disposed extending upward from an upper surface of the lower flange on the same circumference as the axial center of the lower flange; a hub that is fitted over the outside of the lower circular cylinder portion and around which the recording tape is wound; a rotational detent member that regulates movement of the hub in the circumferential direction with respect to the lower flange; and an upper circular cylinder portion that extends downward from an undersurface of the upper flange and is welded to an end surface of the lower circular cylinder portion such that the hub is interposed and held between the upper flange and the lower flange. A recording tape cartridge that includes this reel.

25 Claims, 6 Drawing Sheets

REEL AND RECORDING TAPE CARTRIDGE

CROSS-REFERENCE TO RELATED APPLICATION

This application claims priority under 35 USC 119 from Japanese Patent Application No. 2006-123918 filed Apr. 27, 2007, the disclosure of which is incorporated by reference herein.

BACKGROUND OF THE INVENTION

1. Technical Field

The present invention relates to a reel that winds recording tape such as magnetic tape and to a recording tape cartridge.

2. Related Art

As external storage media for computers and the like, recording tape cartridges are known which include a case housing a reel onto which, for example, a magnetic tape is wound. The reel includes a hub, which configures the axial center portion of the reel and around whose outer periphery the magnetic tape is wound, and an upper flange and a lower flange, which project outward in the radial direction from both axial direction ends of the hub.

Conventionally, a recording tape cartridge has been known which includes a single reel onto which is wound recording tape such as magnetic tape used as a data recording and playback medium for computers and the like, and the reel is rotatably housed inside a case made of synthetic resin. A leader member, such as a leader pin, leader tape, or a leader block, is provided on the distal end (free end) of the recording tape, and a pullout member disposed in a drive device pulls out the leader member from an opening in the recording tape cartridge so that the recording tape fixed to the pullout member is wound onto a take-up reel in the drive device.

In the reel of such recording tape cartridges, the recording tape is ordinarily wound around the outer peripheral surface of the hub. The upper flange and the lower flange are disposed on the top and bottom of the hub, the height position of the recording tape in the vertical direction is regulated by the upper and lower flanges, the recording tape is retained such that its wound form is good, its running stability improves, and excessive damage is prevented when the recording tape is not in use.

For example, in Japanese Patent Application Publication (JP-A) No. 2001-118358, a loop member formed in a loop is provided extending downward from the undersurface of the upper flange, and a leg portion formed with a claw portion engageable with the loop member is provided on the upper surface of the lower flange. With the claw portion engaged with the loop member, the hub is interposed between and held by the upper flange and the lower flange so as to permit the magnetic tape to be wound onto the outer peripheral surface of the hub.

However, when the reel is dropped with the magnetic tape wound onto the hub, there is the possibility for the claw portion to be easily disengaged from the loop member and for the claw portion and the loop member to sustain damage, so that problems in terms of strength are of concern.

SUMMARY

In view of these circumstances, the present invention provides a reel and a recording tape cartridge whose hub does not easily disengage and sustain damage even when the recording tape cartridge is dropped.

One aspect of the present invention is a reel that includes: an upper flange that retains a width direction edge portion of recording tape; a lower flange that, together with the upper flange, retains a width direction edge portion of the recording tape; a lower circular cylinder portion disposed extending upward from upper surface of the lower flange on the same circumference as the axial center of the lower flange; a hub that is fitted over the outside of the lower circular cylinder portion and around which the recording tape is wound; a rotational detent member that regulates movement of the hub in the circumferential direction with respect to the lower flange; and an upper circular cylinder portion that extends downward from an undersurface of the upper flange and is welded to an end surface of the lower circular cylinder portion such that the hub is interposed and held between the upper flange and the lower flange.

Another aspect of the present invention is a recording tape cartridge disposed with a reel that includes: an upper flange that retains a width direction edge portion of recording tape; a lower flange that, together with the upper flange, retains a width direction edge portion of the recording tape; a lower circular cylinder portion disposed upward from an upper surface of the lower flange on the same circumference as the axial center of the lower flange; a hub that is fitted over the outside of the lower circular cylinder portion and around which the recording tape is wound; a rotational detent member that regulates movement of the hub in the circumferential direction with respect to the lower flange; and an upper circular cylinder portion that extends downward from an undersurface of the upper flange and is welded to an end surface of the lower circular cylinder portion such that the hub is interposed and held between the upper flange and the lower flange.

Other aspects, features and advantages of the present invention will become apparent from the following description taken in conjunction with the accompanying drawings.

DETAILED DESCRIPTION

A reel 10 according to an exemplary embodiment of the present invention will be described with reference to FIG. 1 to FIG. 6. First, a schematic overall configuration of a recording tape cartridge 12 to which the reel 10 is applied will be described, and then the reel 10 will be described in detail. For the convenience of description, arrow A will represent the direction in which the recording tape cartridge 12 is loaded into a drive device and be referred to as a forward direction (front side), and arrow B and arrow C, which are orthogonal to the direction represented by arrow A, will respectively represent a rightward direction and an upward direction.

Configuration of the Recording Tape Cartridge

Figure 1:
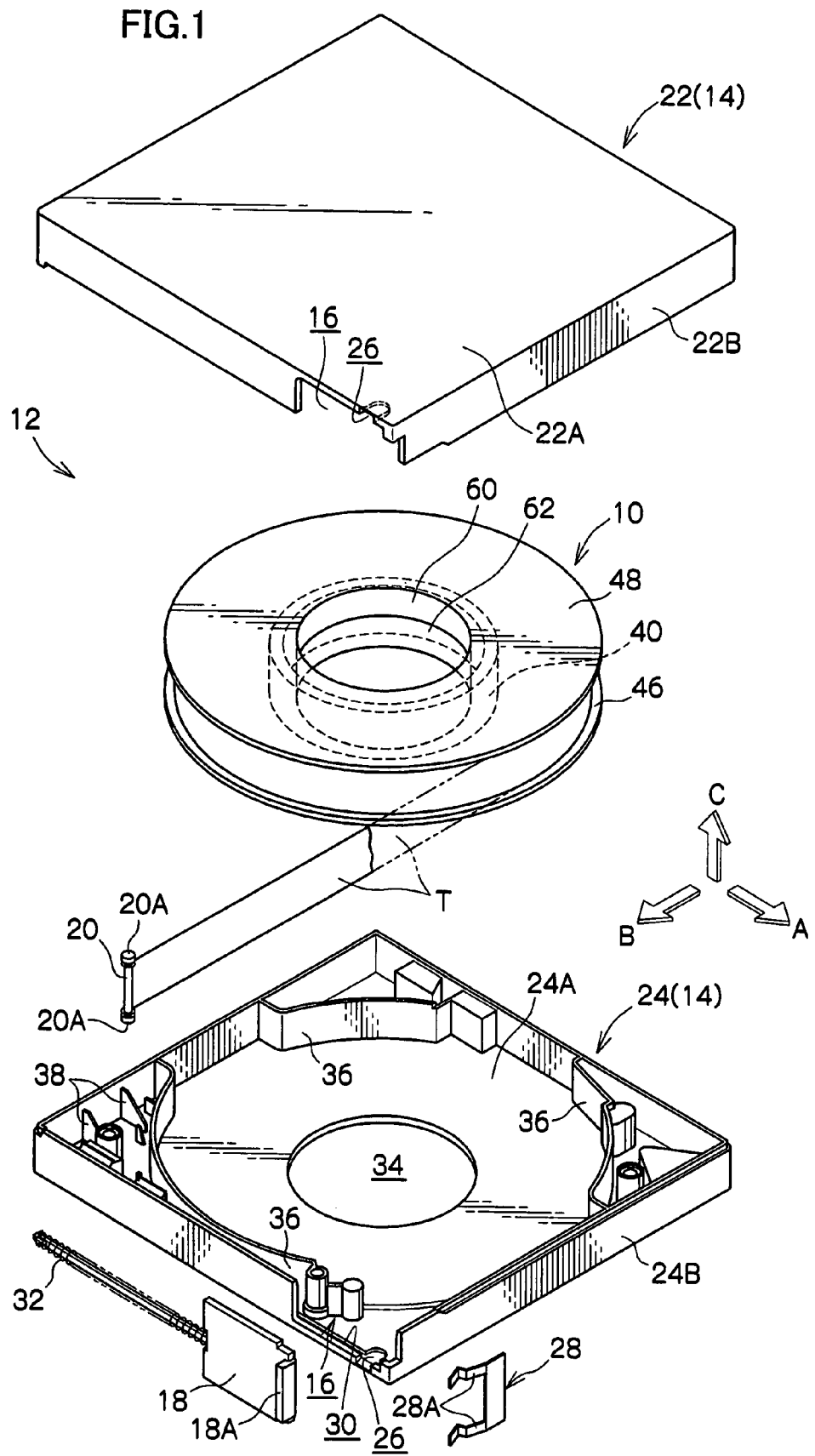
FIG. 1 is an exploded perspective view showing the overall configuration of a recording tape cartridge according to an exemplary embodiment of the invention.

In FIG. 1, there is shown an exploded perspective view of the recording tape cartridge 12. The recording tape cartridge 12 is configured to include a case 14 and a single reel 10. The case 14 has a substantially rectangular shape when seen in plan view, and the reel 10 is rotatably housed inside the case 14. Magnetic tape T serving as recording tape that is an information recording and playback medium is wound onto the reel 10.

An opening 16 for pulling the magnetic tape T outside the case 14 is formed in the front end portion of a right side wall of the case 14. The opening 16 is closed by a door 18 when the recording tape cartridge 12 (the magnetic tape T) is not in use, and the opening 16 is opened inside the drive device when the recording tape cartridge 12 is in use.

A leader pin 20 that is a leader member is attached to the distal end of the magnetic tape T. The leader pin 20 is formed in a small circular column shape, and flange portions 20A, provided on both longitudinal direction ends of the leader pin 20 in a manner such as to project further upward and downward than the width direction edge portions of the magnetic tape T, are caught by a pullout member in the drive device to allow the magnetic tape T to be pulled out from the case 14.

The case 14 is configured by joining together an upper case 22 and a lower case 24. The upper case 22 is configured by disposing a substantially frame-like peripheral wall 22B extending down along the outer edge of a top plate 22A that has a substantially rectangular shape when seen in plan view. The lower case 24 is configured by disposing a peripheral wall 24B extending up along the outer edge of a bottom plate 24A that has a shape substantially corresponding to the top plate 22A. The case 14 is formed in a substantially box-like shape when the upper case 22 and the lower case 24 are joined together by ultrasonic welding or with screws in a state where the open end of the peripheral wall 22B and the open end of the peripheral wall 24B are brought into contact with each other.

The opening 16 is formed in a substantially rectangular shape when seen in side view and opens rightward at the front end of a right side wall 14A (the wall of the case 14 that faces right and is configured by the peripheral wall 22B and the peripheral wall 24B) of the case 14 along the direction of arrow A. Pin holding concave portions 26 that house the upright flange portions 20A of the leader pin 20 are formed in the top plate 22A and the bottom plate 24A. Each of the pin holding concave portions 26 opens rightward in the vicinity of the front end of the opening 16 and enables the leader pin 20 to enter and exit the case 14 via the opening 16.

A plate spring 28 is attached in the vicinity of the front end of the case 14, and a pair of, upper and lower, arms 28A is provided on the plate spring 28. The distal ends of the arms 28A engage with the flange portions 20A of the leader pin 20, whereby the plate spring 28 holds the leader pin 20 with respect to the case 14. This held state is released by pulling the leader pin 20 rightward with a force equal to or greater than a predetermined value.

The door 18 that opens and closes the opening 16 is formed in a substantially rectangular flat plate shape capable of closing the opening 16 on its own. The end portions on the top and bottom of the door 18 slidably fit into guide grooves 30 disposed in the top plate 22A and the bottom plate 24A along the open face of the opening 16 and along the right side wall 14A.

Thus, the door 18 is configured to slide frontward and rearward while being guided in the guide grooves 30 such that the door 18 can selectively assume a closed position where it closes the opening 16 and an open position where it opens the opening 16. The door 18 is also biased frontward by a coil spring 32 that is a biasing member disposed between the door 18 and the case 14, so the door 18 is ordinarily positioned in the closed position by this biasing force. An operation portion 18A is disposed on the front end of the door 18 so as to project rightward. The door 18 can be moved to the open position counter to the biasing force of the coil spring 32 by pressing the operation portion 18A rearward.

A gear opening 34 for exposing a later-described reel gear 50 (see FIG. 2) of the reel 10 is disposed in the center portion of the bottom plate 24A of the case 14. The reel 10 is driven to rotate, without contact, inside the case 14 when a drive gear of the drive device meshes with the reel gear 50 and rotates.

The case 14 is also disposed with a guide regulation wall 36. The guide regulation wall 36 is disposed extending down from the top plate 22A and up from the bottom plate 24A along portions of a circumference coaxial with the gear opening 34, and is configured by bringing respective lower and upper ends thereof into contact with each other. The guide regulation wall 36 is configured to prevent the reel 10 from rattling about, and its end portions are formed continuously with the peripheral walls 22B and 24B to prevent the ingress of dust and the like into the area where the reel 10 is disposed.

Configuration of the Reel

Figure 2:
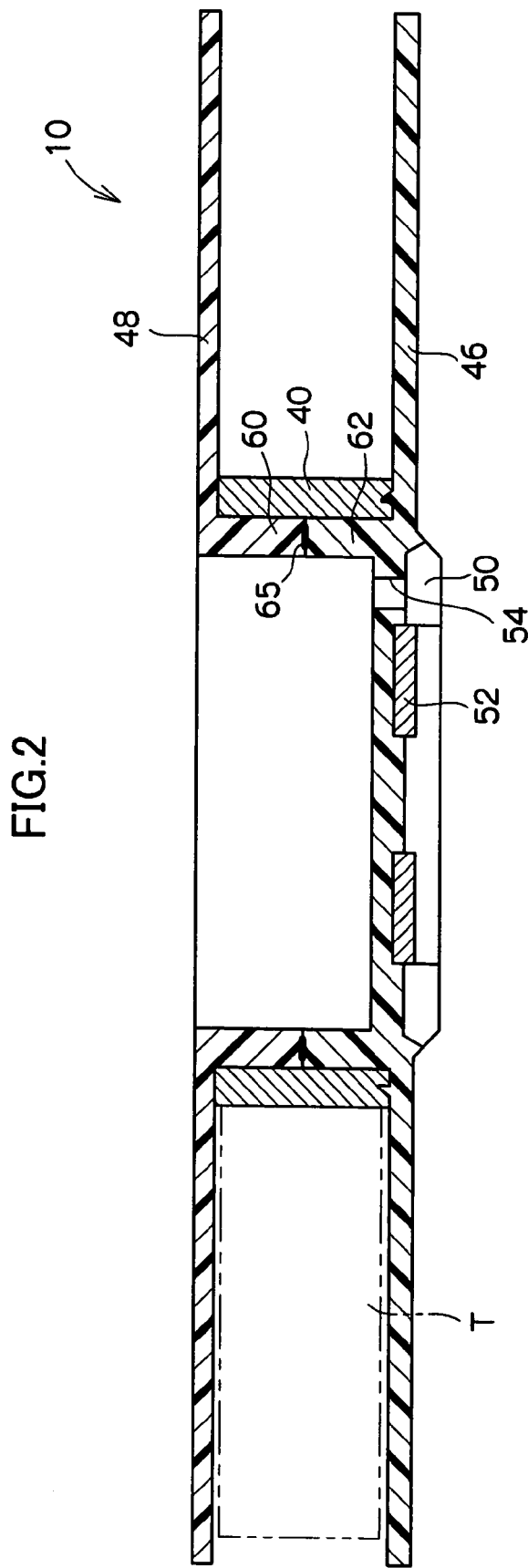
FIG. 2 is a schematic cross-sectional view showing a reel according to the exemplary embodiment of the invention.
Figure 3:
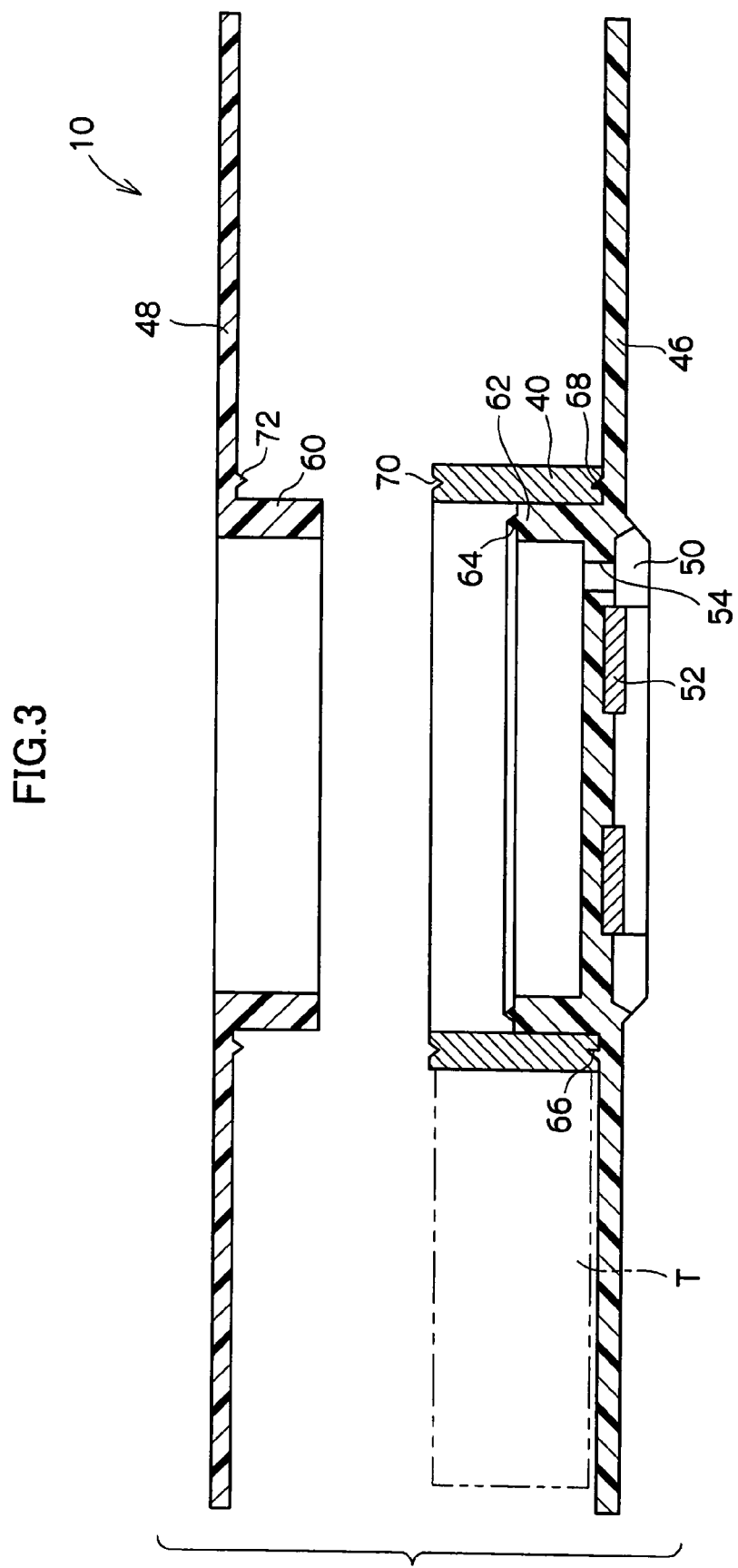
FIG. 3 is an exploded cross-sectional view of the reel according to the exemplary embodiment of the invention.

In FIG. 2 and FIG. 3, there are shown cross-sectional views of the reel 10. The reel 10 is broadly divided into an annular upper flange 48, a substantially circular cylinder-shaped hub 40, and a substantially discoid lower flange 46, and each is formed by a resin (e.g., a polycarbonate including 10% glass-reinforced fiber).

An upper circular cylinder portion 60 having a circular cylinder shape extends downward from the inner edge portion of the upper flange 48, and a lower circular cylinder portion 62, having a circular cylinder shape whose diameter is substantially the same as that of the upper circular cylinder portion 60 and which is taller than the upper circular cylinder portion 60, is disposed upright on the upper surface of the lower flange 46.

A welding rib 64 whose cross section has a triangular shape is disposed along the circumferential direction of the lower circular cylinder portion 62 so as to project from the center portion of the end surface of the lower circular cylinder portion 62. When the welding rib 64 is melted by ultrasonic welding or the like in a state where the upper circular cylinder portion 60 has been brought into contact with the welding rib 64, the upper circular cylinder portion 60 is welded to the lower circular cylinder portion 62.

Incidentally, the hub 40 has an inner diameter dimension that is slightly larger than the outer diameter dimension of the lower circular cylinder portion 62 and the upper circular cylinder portion 60. Further, the length of the hub 40 is equal to the sum of the lengths of the lower circular cylinder portion 62 and the upper circular cylinder portion 60, and the hub 40 can be inserted over the outside of the lower circular cylinder portion 62 and the upper circular cylinder portion 60.

Here, a clearance h of about 0.1 to 1.0 mm is disposed between the inner peripheral surface of the hub 40 and the outer peripheral surfaces of the lower circular cylinder portion 62 and the upper circular cylinder portion 60 so that affects resulting from deformation, such as shrinkage accompanying thermal contraction or the like after molding the lower circular cylinder portion 62 and the upper circular cylinder portion 60, do not extend to the hub 40. That is, the hub 40 can maintain its circularity.

Figure 4:
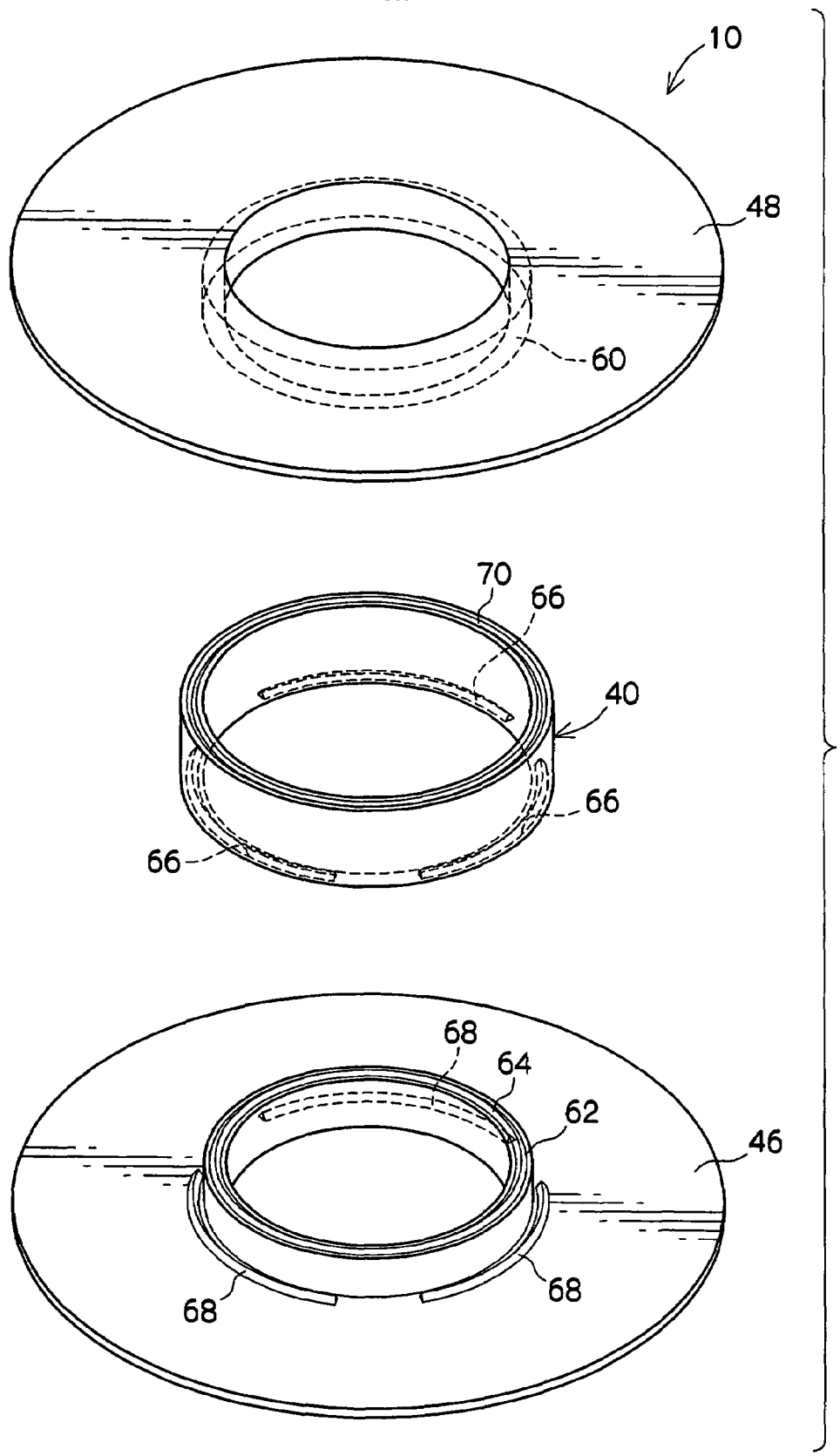
FIG. 4 is an exploded perspective view of the reel according to the exemplary embodiment of the invention.
Figure 5:
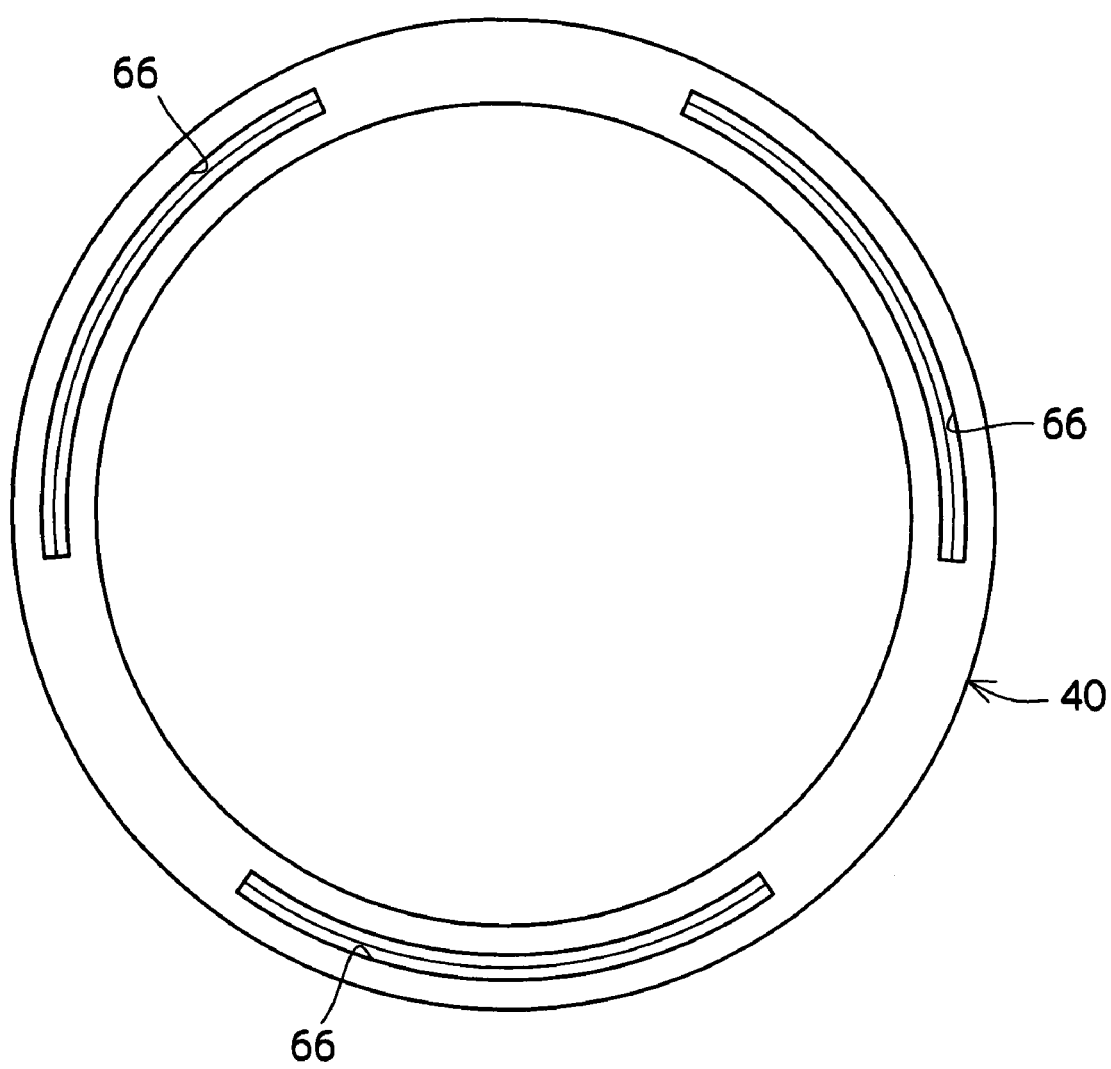
FIG. 5 is a bottom view of a hub of the reel according to the exemplary embodiment of the invention.

As shown in FIG. 4 and FIG. 5, three substantially triangular grooves 66 are formed in the center portion of one end surface (lower end surface) of the hub 40 at equidistant intervals in circular arcs along the circumferential direction of the hub 40. Correspondingly, three ribs 68, whose cross sections are substantially triangular and with which the grooves 66 are engageable, are disposed on the lower flange 46 at equidistant intervals outside of the lower circular cylinder portion 62 so as to project from the lower flange 46. By forming the ribs 68 and the grooves 66 intermittently in this manner, the hub 40 is rotationally detented with respect to the lower flange 46 in a state where the grooves 66 are engaged with the ribs 68.

Figure 6:
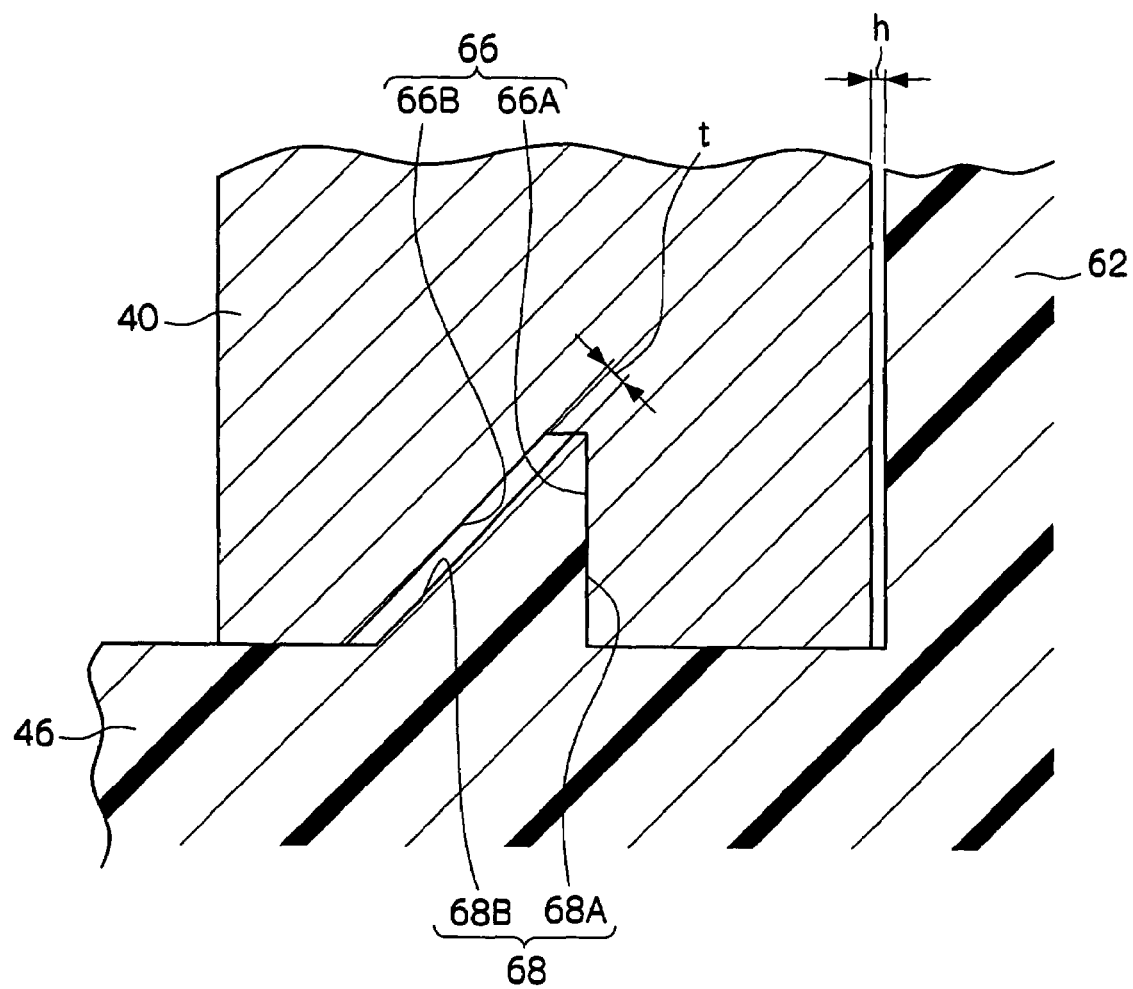
FIG. 6 is an enlarged cross-sectional view showing a state of engagement between a lower flange and the hub of the reel according to the exemplary embodiment of the invention.

Further, as shown in FIG. 6, a wall surface 68A on the inner peripheral side of each of the ribs 68 is formed at a substantial right angle with respect to the upper surface of the lower flange 46 and surface-contacts a groove wall 66A on the inner peripheral side of each of the grooves 66 in the hub 40 (below, the wall surface 68A will be called "the contact surface 68A"). For this reason, the hub 40 is positioned by the contact with the contact surfaces 68A of the ribs 68 and becomes disposed coaxially with respect to the lower flange 46.

Here, the height of each of the ribs 68 is about 1.5 to about 2.0 mm, and a clearance t of 0.1 mm or greater (preferably 0.1 to 1.0 mm) is disposed between a groove wall 66B on the outer peripheral side of each of the grooves 66 and a wall surface 68B on the outer peripheral side of each of the ribs 68.

Further, as shown in FIG. 3, an annular engagement groove 70 is formed in the other end surface (upper end surface) of the hub 40, and an engagement rib 72 engageable with the engagement groove 70 is disposed on the undersurface of the lower flange 48.

Because of the above configuration, as shown in FIG. 3 and FIG. 6, the engagement rib 72 of the upper flange 48 is caused to engage with the engagement groove 70 in the hub 40 in a state where the hub 40 has been slipped over the outside of the lower circular cylinder portion 62 of the lower flange 46, the groove walls 66A of the grooves 66 in the hub 40 have been brought into contact with the contact surfaces 68A of the ribs 68, and the hub 40 has been positioned with respect to the lower flange 46.

The upper circular cylinder portion 60 is welded to the lower circular cylinder portion 62 in a state where the upper circular cylinder portion 60 and the lower circular cylinder portion 62 are covered by the hub 40 so that, as shown in FIG. 2, the hub 40 is interposed between and held by the upper flange 48 and the lower flange 46, and the upper flange 48, the lower flange 46, and the hub 40 are integrated in a state where the upper flange 48, the lower flange 46, and the hub 40 are coaxially arranged.

The magnetic tape T is wound around the outer peripheral surface of the hub 40, and the lower flange 46 and the upper flange 48 regulate positional shifting in the width direction (the axial line direction of the hub 40) of the magnetic tape T wound around the hub 40.

An annularly formed reel gear 50 is disposed on the outer surface (undersurface) of the center portion of the lower flange 46. The reel gear 50 is exposed from the gear opening 34 in the case 14 (see FIG. 1) and relatively moves along the axial line direction with respect to a rotating shaft of the drive device, so that the reel gear 50 can mesh with, and disengage from, a drive gear disposed on the distal end of the rotating shaft.

A reel plate 52 comprising a magnetic material is integrally disposed, by insert molding, on the radial direction inner side of the reel gear 50. The reel plate 52 is configured to be attracted to and retained by, without contacting, a magnet disposed on the distal end of the rotating shaft.

An unillustrated lock mechanism, for blocking rotation of the reel 10 when the magnetic tape T is not in use, is disposed on the inner side of the inner surface (upper surface) of the lower flange 46. The lock mechanism includes a lock member rotationally detented with respect to the case 14 and supports the lock member such that the lock member can move into contact with and away from the reel 10. By moving into contact with, and away from, the reel 10, the lock member can assume a rotation lock position, where it engages with an engagement portion (not shown) of the lower flange 46 to block rotation of the reel 10 with respect to the case 14, and a release position where it disengages from the engagement portion to allow rotation of the reel 10.

For this reason, the engagement portion with which the lock member engages is disposed in the lower flange 46, and an operation hole 54 for allowing a lock release member of the drive device to operate the lock member is formed in the lower flange 46. In this exemplary embodiment, an example is shown where the operation hole 54 is disposed in the site where the reel gear 50 is formed, but the operation hole 54 may also be disposed in the axial center portion of the center portion of the lower flange 46, for example.

As described above, the lower flange 46 is where the reel gear 50 is formed and has the function of transmitting the rotational force from the drive device, the function of closing the gear opening 34 in the case 14 when the magnetic tape T is not in use, and the function of allowing the lock member to engage therewith to block rotation of the reel 10 with respect to the case 14.

Next, the action of the exemplary embodiment of the present invention will be described.

When the recording tape cartridge 12 is loaded into the drive device to record information to the magnetic tape T or play back information recorded on the magnetic tape T, the rotational lock with respect to the case 14 is released and the rotating shaft whose drive gear is meshed with the reel gear 50 of the reel 10 shown in FIG. 1 and FIG. 2 rotates, whereby the reel 10 rotates inside the case 14.

At this time, the leader pin 20 that has already been removed from the opening 16 is retained in the take-up reel of the drive device, and the take-up reel rotates synchronously with the reel 10, whereby the magnetic tape T is successively pulled out from the case 14. Then, a recording and playback head disposed along a predetermined tape path writes information to the magnetic tape T or reads information recorded on the magnetic tape T. After the magnetic tape T is used, the reel 10 takes up the magnetic tape T and returns to its initial state.

Incidentally, in the present exemplary embodiment, as shown in FIG. 2 and FIG. 3, the upper circular cylinder portion 60 is disposed on the upper flange 48, the lower circular cylinder portion 62 is disposed on the lower flange 46, the outer peripheral surfaces of the upper circular cylinder portion 60 and the lower circular cylinder portion 62 are covered by the hub 40, the upper circular cylinder portion 60 is welded to the lower circular cylinder portion 62, and the hub 40 is interposed between and held by the upper flange 48 and the lower flange 46, so that the upper flange 48, the lower flange 46, and the hub 40 are integrated.

By welding the upper circular cylinder portion 60 and the lower circular cylinder portion 62 positioned inside the hub 40 together in this manner, even when resin 65, which is the melted welding rib 64, sticks out a little from the outer peripheral surface of the upper circular cylinder portion 60 or the lower circular cylinder portion 62 when the upper circular cylinder portion 60 and the lower circular cylinder portion 62 are welded together, affects do not extend to the outer peripheral surface of the hub 40 around which the magnetic tape T is wound. That is, the area of the welding rib 64 can be enlarged and welding strength can be improved in comparison to when the hub 40 is disposed integrally with the upper flange. 48 or the lower flange 46 and they are welded to each other.

Here, by making the lower circular cylinder portion 62 taller than the upper circular cylinder portion 60, the welding places and horn used as an ultrasound generating member during ultrasonic welding become closer so that welding efficiency improves.

Further, by ensuring that the upper circular cylinder portion 60 and the lower circular cylinder portion 62 are covered by the hub 40, the hub 40 can be reinforced by the lower circular cylinder portion 62 or the upper circular cylinder portion 60 positioned inside the hub 40, so that the strength of the hub 40 can be improved. For this reason, deformation of the hub 40 resulting from constriction of the magnetic tape T can be prevented.

Further, because the upper flange 48, the hub 40, and the lower flange 46 are integrated by welding together the upper circular cylinder portion 60 and the lower circular cylinder portion 62, the hub 40 does not easily come off and sustain damage even when the recording tape cartridge 12 is dropped, in comparison to when the upper flange and the lower flange are integrated by the locking of claws or the like, though it is not shown. There is also no possibility for rattling about to occur or for the axial centers of the upper flange 48, the hub 40, and the lower flange 46 to shift due to rattling about.

As shown in FIG. 6, the substantially triangular grooves 66 are disposed in the hub 40, the ribs 68, whose cross sections are substantially triangular and with which the grooves 66 are engageable, are disposed on the lower flange 46, the contact surfaces 68A that surface-contact the groove walls 66A on the inner peripheral sides of the grooves 66 in the hub 40 are formed on the inner peripheral sides of the ribs 68, and the hub 40 is positioned by contact with the contact surfaces 68A, so the hub 40 can be arranged coaxially with respect to the lower flange 46.

That is, as shown in FIG. 2, the axial center of the reel gear 50 disposed on the lower flange 46 and the axial center of the hub 40 can be made to coincide with each other. Thus, the precision of the meshing between the reel gear 50 and the drive gear of the drive device can be improved, and the reel 10 can be rotated in a state where it has been stabilized. Further, because the grooves 66 and the ribs 68 are formed in substantially triangular shapes, the grooves 66 easily fit together with the ribs 68.

Further, as shown in FIG. 6, the clearance t is disposed between the wall surface 68B on the outer peripheral side of each of the ribs 68 and the groove wall 66B on the outer peripheral side of each of the grooves 66. Thus, deformation of the hub 40 that occurs when the magnetic tape T is wound onto the hub 40 is absorbed by the clearance t to ensure that affects do not extend to the lower flange 46.

Moreover, as shown in FIG. 3, the engagement groove 70 is formed in the upper end surface of the hub 40, and the engagement rib 72 engageable with the engagement groove 70 is formed on the upper flange 48, so that coaxiality of the upper flange 48 also with respect to the hub 40 and the lower flange 46 can be obtained.

In the present exemplary embodiment, the grooves 66 have a substantially triangular shape, but the grooves 66 are not limited to this shape and may also be quadrangular or curved because it suffices as long as contact surfaces can be disposed on the inner peripheral sides of the grooves 66.

Moreover, in the present exemplary embodiment, the reel 10 was formed by a polycarbonate including glass-reinforced fiber, but carbon fiber or talc may also be added to the polycarbonate because it suffices as long as the mechanical strength of the reel 10 can be strengthened.

Further, in the above-described exemplary embodiment, an example was described where the reel 10 was applied to the recording tape cartridge 12 configured to house a single reel inside the case 14, but the present invention is not limited to this. For example, the reel 10 can also be applied to a 2-reel type recording tape cartridge that houses two reels inside a case.

What is claimed is:

1. A reel comprising:
    an upper flange that retains a width direction edge portion of a recording tape;
    a lower flange that, together with the upper flange, retains a width direction edge portion of the recording tape;
    a lower circular cylinder portion disposed extending upward from an upper surface of the lower flange on the same circumference as the axial center of the lower flange;
    a hub that is fitted over the outside of the lower circular cylinder portion and around which the recording tape is wound;
    a rotational detent member that regulates movement of the hub in the circumferential direction with respect to the lower flange;
    an upper circular cylinder portion that extends downward from an undersurface of the upper flange and is welded to an end surface of the lower circular cylinder portion such that the hub is interposed and held between the upper flange and the lower flange; and
    a reel gear, which extends from a lower surface of the lower flange.

2. The reel of claim 1, wherein the lower circular cylinder portion is taller than the upper circular cylinder portion.

3. The reel of claim 2, wherein the rotational detent member is configured to include engaged portions formed on the upper surface of the lower flange intermittently along the circumferential direction and engagement portions that are formed in one end surface of the hub and are engageable with the engaged portions.

4. A recording tape cartridge including the reel of claim 3.

5. A recording tape cartridge including the reel of claim 2.

6. The reel of claim 1, wherein the rotational detent member is configured to include engaged portions formed on the upper surface of the lower flange intermittently along the circumferential direction and engagement portions that are formed in one end surface of the hub and are engageable with the engaged portions.

7. The reel of claim 6, wherein the engaged portions are ribs disposed so as to project from the upper surface of the lower flange, and the engagement portions are grooves that are formed in the one end surface of the hub and into which the ribs fit.

8. The reel of claim 7, wherein wall surfaces on inner peripheral sides of the ribs and groove walls of the grooves surface-contact each other along the circumferential direction.

9. The reel of claim 8, wherein a clearance is disposed between wall surfaces on outer peripheral sides of the ribs and groove walls of the grooves.

10. A recording tape cartridge including the reel of claim 9.

11. recording tape cartridge including the reel of claim 8.

12. The reel of claim 7, wherein a clearance is disposed between wall surfaces on outer peripheral sides of the ribs and groove walls of the grooves.

13. A recording tape cartridge including the reel of claim 12.

14. A recording tape cartridge including the reel of claim 7.

15. The reel of claim 6, wherein an engagement groove is formed in another end surface of the hub, and an engagement rib engageable with the engagement groove is disposed on the upper flange.

16. A recording tape cartridge including the reel of claim 15.

17. A recording tape cartridge including the reel of claim 6.

18. The reel of claim 1, wherein a clearance is disposed between the hub and the upper circular cylinder portion and between the hub and the lower circular cylinder portion.

19. A recording tape cartridge including the reel of claim 18.

20. A recording tape cartridge including the reel of claim 1.

21. The recording tape cartridge of claim 20 comprising:
    an upper case;
    a lower case, and
    wherein when the upper case and lower case are attached to one another, an opening is formed for pulling the recording tape outside the case; and further comprising:
    a door connected to a coil spring, which opens and closes the opening.

22. The reel of claim 1, further comprising a reel plate dispose at an inner side of the reel gear;
    wherein the reel plate is made of a magnetic material.

23. A reel comprising:
    an upper flange that retains a width direction edge portion of a recording tape;
    a lower flange that, together with the upper flange, retains a width direction edge portion of the recording tape;
    a lower circular cylinder portion disposed extending upward from an upper surface of the lower flange on the same circumference as the axial center of the lower flange;
    a hub that is fitted over the outside of the lower circular cylinder portion and around which the recording tape is wound;
    a rotational detent member that regulates movement of the hub in the circumferential direction with respect to the lower flange; and
    an upper circular cylinder portion that extends downward from an undersurface of the upper flange and is welded to an end surface of the lower circular cylinder portion such that the hub is interposed and held between the upper flange and the lower flange,
    wherein the lower circular cylinder portion is taller than the upper circular cylinder portion;
    wherein the rotational detent member is configured to include engaged portions formed on the upper surface of the lower flange intermittently along the circumferential direction and engagement portions that are formed in one end surface of the hub and are engageable with the engaged portions;
    wherein a plurality of the ribs and the grooves are formed in arc shapes.

24. A recording tape cartridge including the reel of claim 23.

25. A reel comprising:
    an upper flange that retains a width direction edge portion of a recording tape;
    a lower flange that, together with the upper flange, retains a width direction edge portion of the recording tape;
    a lower circular cylinder portion disposed extending upward from an upper surface of the lower flange on the same circumference as the axial center of the lower flange;
    a hub that is fitted over the outside of the lower circular cylinder portion and around which the recording tape is wound;
    a rotational detent member that regulates movement of the hub in the circumferential direction with respect to the lower flange;
    an upper circular cylinder portion that extends downward from an undersurface of the upper flange and is welded to an end surface of the lower circular cylinder portion such that the hub is interposed and held between the upper flange and the lower flange; and
    a reel plate formed of a magnetic material and disposed on a lower surface of the lower flange.

* * * * *